Dec. 19, 1950 W. H. DU SHANE 2,534,425
VEHICLE RADIATOR GRILLE ASSEMBLY
Filed April 23, 1948 3 Sheets-Sheet 1
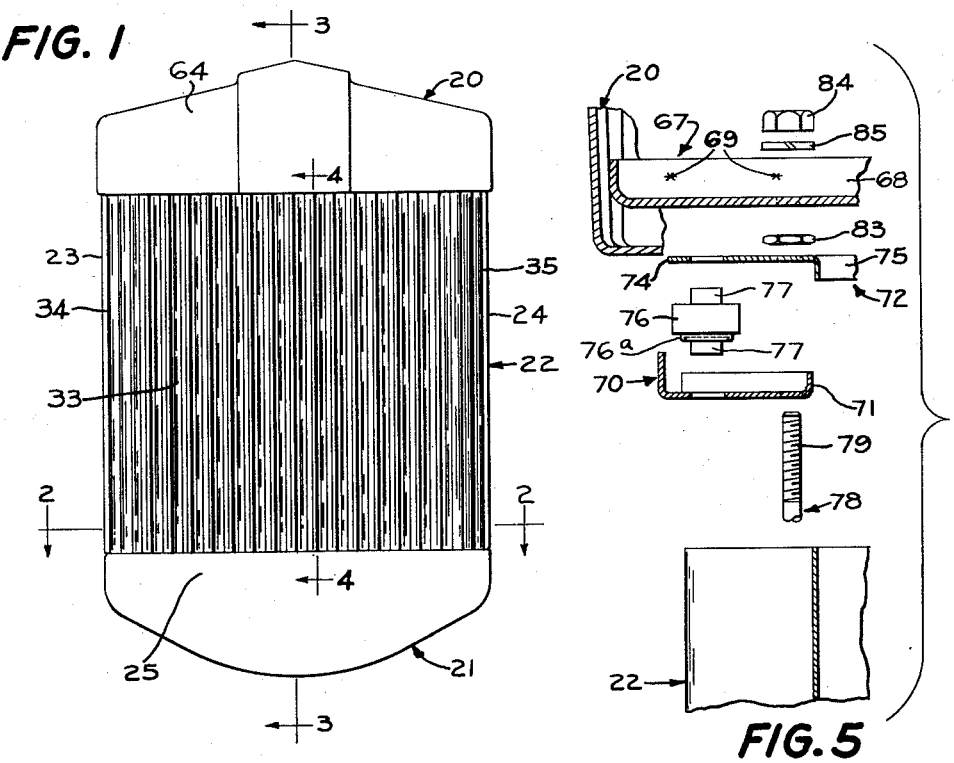
FIG. 1
FIG. 5
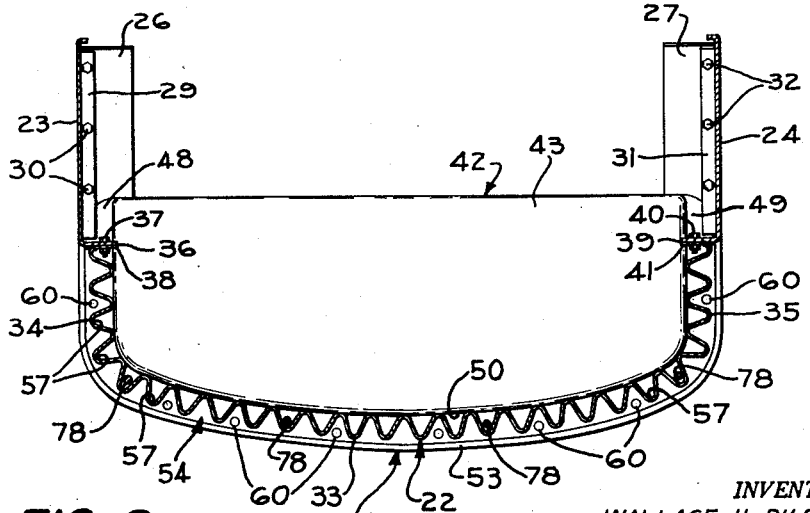
FIG. 2
INVENTOR.
WALLACE H. DU SHANE
BY
ATTORNEYS Dec. 19, 1950 W. H. DU SHANE 2,534,425
VEHICLE RADIATOR GRILLE ASSEMBLY
Filed April 23, 1948 3 Sheets-Sheet 2
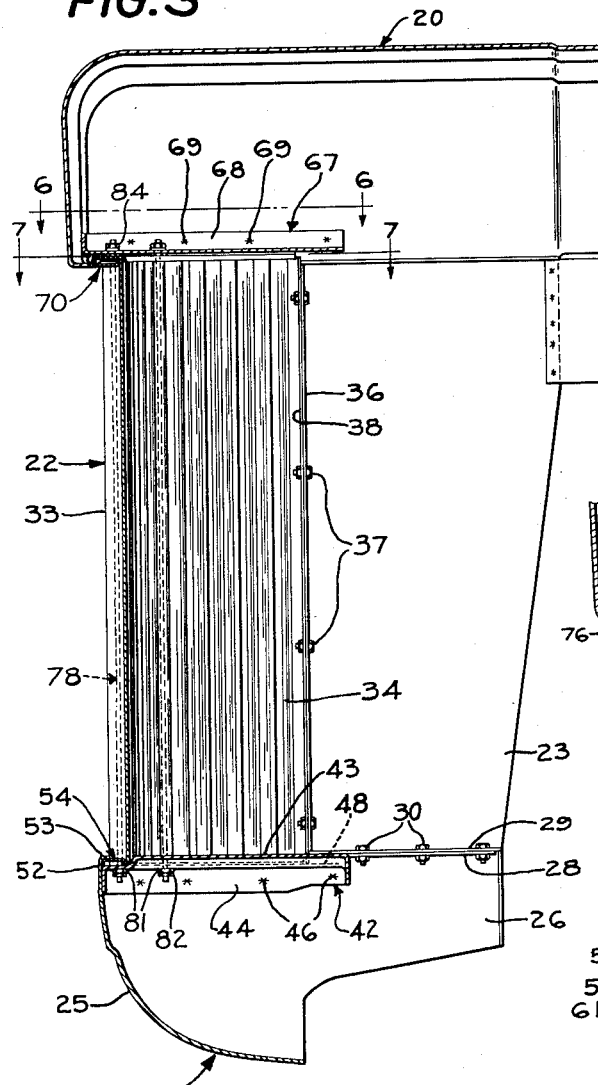
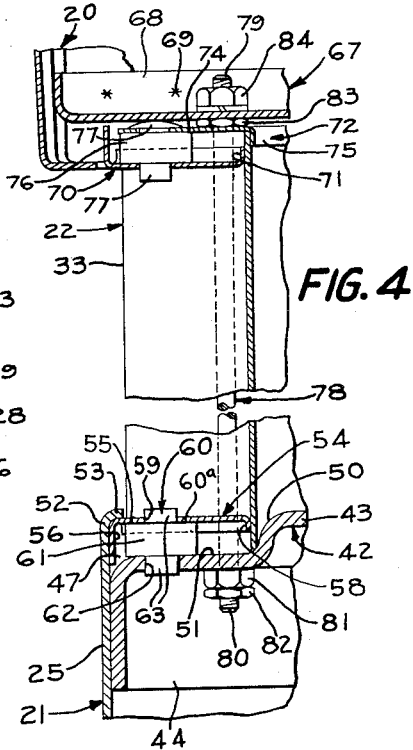
INVENTOR.
WALLACE H. DU SHANE
BY
ATTORNEYS Dec. 19, 1950  W. H. DU SHANE  2,534,425
VEHICLE RADIATOR GRILLE ASSEMBLY Filed April 23, 1948  3 Sheets-Sheet 3

INVENTOR.
WALLACE H. DU SHANE
BY
ATTORNEYS

Patented Dec. 19, 1950

2,534,425

UNITED STATES PATENT OFFICE 2,534,425

VEHICLE RADIATOR GRILLE ASSEMBLY

Wallace H. Du Shane, Waterloo, Iowa, assignor to Deere Manufacturing Co., Dubuque, Iowa, a corporation of Iowa Application April 23, 1948, Serial No. 22,732

20 Claims. (Cl. 180—68)

1

This invention relates to a vehicle radiator grille assembly and pertains particularly to such assembly for use in tractors.

In the development of my invention, I have been primarily concerned with grille structure peculiar to tractors wherein there are experienced such conditions as extreme vibration during operation, the desire for a structure that can be easily and economically manufactured, and the necessity for a structure that can be readily disassembled and assembled in the field, together with the requirement that the structure be neat and pleasing in appearance. With these requirements in mind, my invention has for its principal object the provision of a radiator grille assembly comprising relatively few parts that are in most respects mutually self-supporting or self-reenforcing. In a preferred construction, I make the grille assembly of sheet metal parts having appropriate flanges and recessed portions to accommodate related components. Another object of the invention is to provide a grille assembly that includes a main vertical grille member provided with vertically running corrugations which give the grille member the characteristics of considerable strength combined with light weight, and to provide upper and lower shell members to complete the assembly, these upper and lower members having portions thereon for receiving the upper and lower corrugated ends of the grille member.

A still further object of the invention relates to the means for securing the components of the assembly together, and preferably to the means whereby the upper shell or member may be removed from the remainder of the structure without dismantling the entire assembly.

Other desirable objects and important features inherent in and encompassed by the invention will become apparent to those skilled in the art as the disclosure of a preferred embodiment of the invention is more fully made in the following detailed description and accompanying drawings, in which Figure 1 is a general front elevational view of the grille assembly;

Figure 2 is a transverse sectional view, on an enlarged scale, taken substantially along the line 2—2 of Figure 1;

Figure 3 is a vertical sectional view, on the same scale as Figure 2, taken substantially along the line 3—3 of Figure 1;

Figure 4 is a fragmentary vertical sectional view on a scale somewhat larger than that used in Figures 2 and 3, the view being taken substantially on the line 4—4 of Figure 1, with intermediate portions of the grille member omitted;

Figure 5 is an exploded sectional view based on the upper portions of the illustration in Figure 4;

Figure 6:
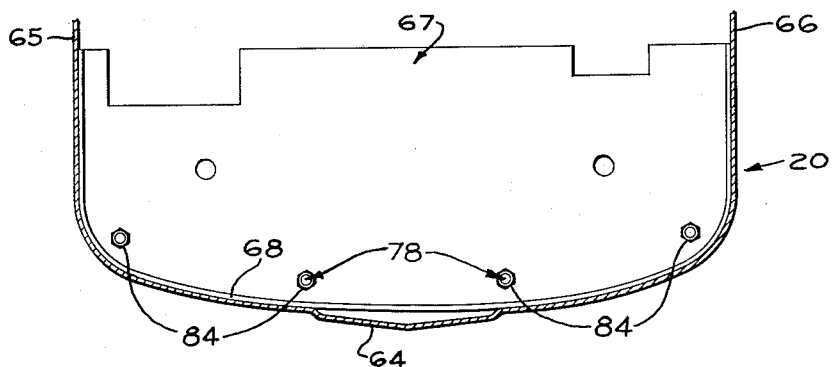
Figure 6 is a transverse sectional view on the same scale as Figures 2 and 3 and taken substantially on the line 6—6 of Figure 3.

In the preferred construction illustrated and about to be described, the invention is characterized by its application to a grille structure in which the main grille member extends vertically and is provided with vertically running corrugations. It is to be understood, however, that the basic principles of the invention are applicable to other instances wherein the component parts may assume other positions and extend in other directions. For the purposes of clarity and brevity, reference will be had to parts as having tops and bottoms and as extending in certain directions, with the idea in mind that the language employed here and in the claims is intended to include structures having equivalent characteristics regardless of the disposition of parts or the direction of extension thereof.

In general, the improved grille assembly comprises relatively few component parts, being built basically about an upper shell member 20; a lower shell member or base 21; a grille member or element 22, interposed between the shells 20 and 21; and a pair of side sheets, one being a right hand side sheet 23 and the other being a left hand sheet 24 (the term "right hand" and "left hand" being used with reference to the position of an observer at the rear of the assembly and looking forward).

The base or lower shell member 21 includes a generally transverse substantially arcuate front portion 25 which curves rearwardly at each of its opposite ends to provide a pair of generally longitudinally running side portions 26 and 27, which are positioned respectively below the side sheets 23 and 24 (Figure 2). The right hand side portion 26 includes at its upper edge a horizontal longitudinal flange 28 on which rests a horizontal longitudinal flange 29 preferably formed as an integral part of the associated side sheet 23 (Figure 3). The flanges 28 and 29 are appropriately apertured to receive a plurality of fasteners, such as bolts and nuts 30. The opposite side portion 27 of the base member or shell member 21 is provided with a horizontal longitudinal flange (not shown) upon which rests a horizontal longitudinal flange 31 preferably formed integral with the associated side sheet 24. These flanges are likewise appropriately apertured to receive a plurality of fastening elements, such as bolts and nuts 32.

As best shown in Figure 2, the grille member 22 is provided with a plurality of transversely spaced vertically running corrugations and the general cross sectional configuration of the grille member as viewed from above is generally arcuate so as to provide a transverse arcuate intermediate portion or front wall 33 which corresponds generally in shape to and is positioned above the transverse front wall 25 of the base member 21. The grille member further includes at each of its opposite ends a rearwardly extending portion 34 at the right side and 35 at the left side. The rearwardly extending part 34 of the grille member 22 extends vertically above the forward portion of the right hand side portion 26 of the base member 21; that is to say, the part 34 occupies that portion of the side portion 26 that is not occupied by the associated side sheet 23. The opposite side portion 35 of the grille member is similarly associated with the opposite side portion 27 of the base member and the associated side sheet 24. The forward vertical edge of the right hand side sheet 23 terminates in a flange 36 which is secured by a bolt and nut assembly 37 to a complementary flange 38 on the part 34 of the grille member 22. The forward portion of the left hand side member 24 is similarly flanged at 39 and a nut and bolt assembly 40 is utilized to secure this flange to a complementary flange 41 on the rear portion of the right hand part 35.

The base member 21 includes a mounting structure, indicated generally by the numeral 42 (Figures 2, 3 and 4), which comprises essentially a transverse horizontal intermediate portion 43 having a face to conform generally to the interior part of the upper portion of the base member 21 within which it fits. The edge of the mounting plate 42 terminates in an integral depending flange 44 which is contoured to fit within the base member or shell 21, the flange having portions corresponding to the portions 25, 26 and 27 of the base member; although, the side portions of the flange do not extend completely rearwardly coextensive with the side portions 26 and 27 of the base member 21 (Figure 3). The mounting plate 42 and base member 21 are interconnected together in such manner as to provide a rigid structure, just as if the two were made of one piece, this result being accomplished by preferably spot welding the flange 44 to the interior portion of the base member 21, as indicated at 46 in Figure 3.

The forward and opposite sides of the mounting plate 42 are depressed or otherwise formed to provide a recess 47 that extends around the three sides of the intermediate portion 43. The general shape of the recess, as viewed from above, is such as to conform the recess to the interior outline of the base member 21 and to the bottom portion of the grille member 22. The recess 47 extends longitudinally to the rear at each side of the intermediate portion 43, as at 48 and 49 in Figure 2, to accommodate the rearwardly extending side portions 34 and 35, respectively, of the grille member 22 (see also Figure 3). The formation of the recess 47 results in the provision on the mounting plate 42 of a shoulder 50, which follows and delineates the inner edge or wall of the recess. The bottom of the recess is formed by the depressed portion of the mounting plate 42, which results in a horizontal portion or ledge 51 on which the lower part of the grille member 22 rests (Figure 4).

As best shown in Figure 4, the top portion of the front wall 25 of the base 21 projects upwardly beyond the horizontal ledge 51 formed by the recess, the upward extension of the wall being indicated at 52. The upward extension of the wall, as at 52, is carried around the base member 21 and coextensive with the forward parts of the side portions 26 and 27. The upwardly projecting wall portion 52 is bent backwardly to provide a rearwardly directed flange 53 which likewise is carried around the side portions 26 and 27, ultimately running into the horizontal flanges of the side portions on which the bottom flanges 29 and 31 of the side sheets 23 and 24, respectively, rest, as previously described. The vertical extension or upward projection of the portion 52 from the front wall 25 and side portions of the base member 21 combine with the recess 47 to provide an upwardly opening channel defined by the ledge 51, the shoulder portion 50 and the wall portion 52. The general cross sectional appearance of the channel, as shown in Figure 4, is, of course, carried around the lower supporting structure, including the base member 21 and mounting plate 42, to an extent sufficient to receive the lower end of the grille member 22. The rearwardly directed flange 53 overlies the channel, as shown.

From the description thus far it will be seen that the lower part of the grille member 22 is nested in the channel provided by the portions just described. The grille member is secured to the side sheets 23 and 24, as previously described, and the side sheets are further secured to the base member 21, also as previously described. The components, consisting of the base member 21, side sheets 23 and 24, and the grille member 22, are thus mutually self-supporting. As a further means for supporting and locating the grille member 22, particularly with respect to the carrying thereof in the channel, I provide a member, designated generally by the numeral 54, which is in the nature of a generally transversely and arcuately extending strip disposed closely above and generally paralleling the extent of the channel or recess 47. The member 54 may also be considered as a plate-like structure having an upper flat surface portion 55 and an integral front depending flange 56, the latter engaging or abutting the interior surface of the upwardly extending wall portion 52 and further fitting under and being engaged by the upper flange 53 on said upwardly extending wall portion.

Figure 8:
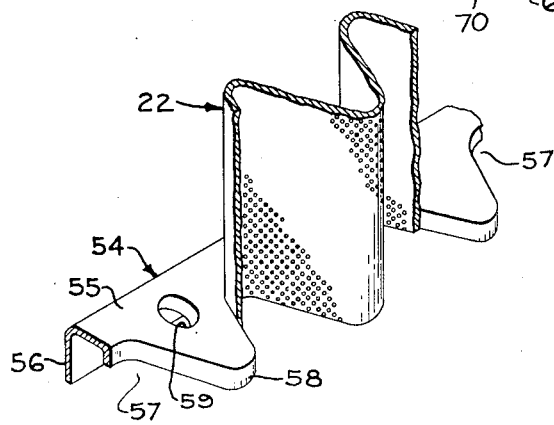
Figure 8 is a fragmentary enlarged perspective view showing the relationship between the grille member and the elements that receive or locate the grille member.

The upper flat-surfaced portion 55 of the member 54 is provided with a plurality of transversely spaced pockets or recesses 57 (Figure 8) the shape and spacing of which is on the order of the cross sectional shape of the grille member 22, as determined by the vertical corrugations therein. On another view of the structure, including the member 54, it may be considered that the member 54 is notched or otherwise formed to provide pockets that are generally of U-shape, as viewed from above, and opening rearwardly toward the shoulder 50 which defines the rear edge of the channel in which the member 54 is located. The member 54 further includes, preferably as an integral part thereof, a depending flange structure, indicated generally by the numeral 58 (Figures 4 and 8), which in transverse extent is contoured according to the corrugated grille member 22 to provide a structure of sinuous configuration. The lower portion of the grille member 22, when nested in the pocketed member 54, has the wall portion that provides the corrugations lying against the portions of the sinuous flange 58 that borders the pockets, so that alternate corrugations fit the pockets and other alternate corrugations receive portions of the member 54 intermediate the pockets.

The upper horizointal portion 55 of the member 54 is appropriately apertured, as at 59 (Figure 8), to receive part of a securing means, preferably in the form of a spacer 60 (Figures 2 and 4), which has a central body 61 and a pair of pilot portions 63 which pass respectively through the aperture 59 and an aligned aperture 62 in the ledge 51 of the recess 47, the spacer being further secured, as by welding at 60a, to the member 54 to complete the securing assembly and to hold the member 54 in position above and in spaced relation to the ledge 51, as described. As best shown in Figure 2, there are a plurality of securing and spacing means 60 spaced at appropriate intervals throughout the extent of the structure thus far described. The securing means are of course located intermediate the pockets 57 in the member 54.

Figure 7:
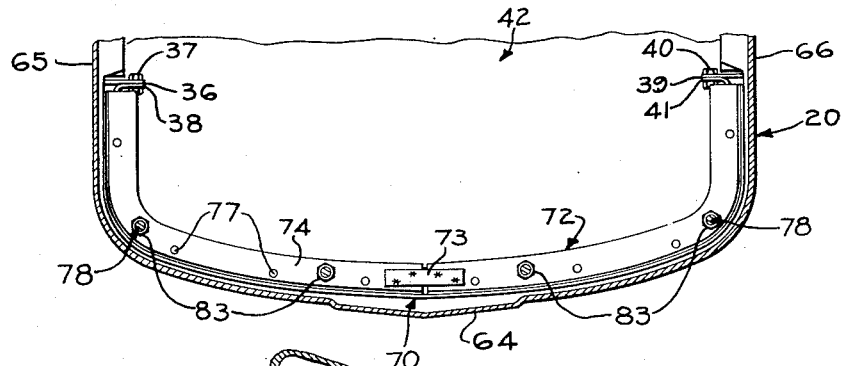
Figure 7 is a transverse sectional view on the same scale as Figures 2, 3 and 6 and taken substantially on the line 7—7 of Figure 3.

The upper member 20 of the grille assembly is, like the lower member 21, of shell-like construction and includes a transverse generally arcuate front wall 64 having opposite rearwardly extending generally parallel side wall portions 65 and 66 (Figures 6 and 7). I provide inside the shell structure 20 an upper mounting plate 67 which preferably takes the form of a transverse horizontal sheet metal plate of generally rectangular shape, with the exception of an arcuate front edge, which is bounded on three sides by a vertical integral flange 68. This flange is preferably spot welded at 69 to portions of the front and side walls of the upper shell 20, thus providing the upper shell and transverse mounting plate 67 as a rigid unitary construction.

Positioned below the mounting plate 67 is a member 70 which has all the structural characteristics of the member 54 previously described in connection with the mounting of the grille member 22 on the lower member 21, except that in the member 70 the parts are generally inverted. The member 70 is therefore provided with a sinuous vertical flange structure 71 which corresponds to the sinuous flange 58 on the member 54 and the member 70 is further pocketed (not shown) to receive the vertical corrugations at the upper end of the grille member 22. Although the details of the member 70 are not shown completely, it will be readily understood that, if shown, they would be substantial duplicates of the details of the member 54.

The member 70 is nested with respect to the upper end of the grille member 22, just as the lower member 54 is nested with respect to the lower end of the grille member. The member 70 is associated with a mounting strip, indicated generally by the numeral 72, which is here shown as comprising two symmetrical halves joined together by a short strip 73 spot welded thereto (Figure 7). The member 72 provides a transverse structure shaped to fit within the upper shell 20 and including an upper horizontal flange portion 74 and an integral depending flange 75 at the rear or inner edge thereof. The horizontal flange 74 lies just below and in closely spaced relation to the horizontal portion of the upper plate 67; and likewise lies above and relatively closely spaced from the horizontal flange portion of the pocketed member 70. The flange 74 and member 70 are appropriately apertured at intervals between the pockets to receive a plurality of securing means, each of which includes preferably a spacer element 76 having a cylindrical body and oppositely extending pilot portions 77 of reduced diameter, the structure and function of which correspond to the securing means 59—63, described in connection with the lower member 54 in the lower mounting plate 42. The lower shoulder between the body and the lower pilot portion is preferably formed as a projection-welding ring 76a which facilitates welding of the spacer to the member 70, after which the upper portion 77 is passed through the opening in the member 74 and riveted over. The rear flange 75 extends downwardly behind the upper portion of the corrugated grille member 22 in a manner similar to the manner in which the shoulder 50 on the lower mounting plate 42 is associated with the lower portion of the grille member. The sinuous flange on the upper pocketed member 70 is associated with the corrugations of the grille member 22 in the manner described in connection with the sinuous flange 58 on the lower member 54.

The grille assembly is secured together by a plurality of securing means, preferably in the form of long rods or bolts 78, each of which has a threaded upper end 79 and a similarly threaded lower end 80 (Figure 4). The member 54 and mounting plate 42 are appropriately apertured in alignment to receive the lower ends of the bolts 78 and the threaded portion 80 of each bolt receives a nut 81 which is drawn up against the under surface of the mounting plate 42, particularly the under surface of the portion defining the ledge 51. The threaded portion 80 further receives a lock nut 82. The upper member 70 and the upper plate or member 67 and 74 are likewise apertured in alignment to receive the upper ends of the bolts 78. The bolts 78 are preferably installed in the assembly prior to the installation of the upper shell 20; that is to say, the grille member 22 and its associated members 54 and 70 are assembled and the bolts 78 placed in position. The upper threaded portion 79 of each bolt then receives a first nut 83, and the nuts 83 are drawn up against the upper surface of the member 72, thus compressing the grille member 22 between the members 72 and 42. The upper shell 20 is now installed and is received by the upper threaded end portions 79 of the bolts 78, which form, in effect, extensions on the securing means for receiving the upper shell. After the upper shell is in place, each threaded portion 79 of each bolt 78 receives a second nut 84 which secures the shell 20 in place. The arrangement is such that the removal of the nuts 84 will permit removal of the upper shell 20 without requiring the dismantling of the remainder of the assembly comprising the grille member 22 and lower supporting structure. Further, the first nut 83 provides means for holding the grille member 22 in place on the lower structure while the upper shell is being installed. As best shown in Figure 2, the bolts 78 pass upwardly within certain of the corrugations in the grille member 22 and thus are concealed when the grille assembly is viewed from the front or either side. A lock washer 85 is provided in conjunction with each nut 84.

It will be seen from the foregoing description that the invention includes the important features of simplicity and economy with respect to manufacture and relatively great strength combined with light weight, inasmuch as the parts are mutually self-supporting and mutually reenforce each other. The nesting of the upper and lower ends of the grille member in the related supporting structures not only serves as improved means for carrying the grille member but also provides locating means tending to facilitate the assembly of the grille structure. In addition to the features pointed out above, other features and applications of the basic principles of the invention will suggest themselves to those skilled in the art, as will likewise numerous modifications and alterations in the preferred structure illustrated, all of which variations can be accomplished without departing from the spirit and scope of the invention as defined in the claims.

I claim:

1. A vehicle radiator grille assembly, comprising: an upper shell having a generally horizontal, substantially flat under surface; a lower shell spaced below the upper shell and having a generally horizontal, substantially flat top surface; a vertically corrugated grille member extending vertically between said under and top surfaces; an upper grille-carrying member disposed below the under surface of the upper shell and having pockets therein to receive the upper part of said corrugated grille member; a lower grille-carrying member mounted on the top surface of the lower shell and having pockets therein to receive the lower part of said corrugated grille member, said pockets having bottoms supporting said grille member; means securing the upper shell to the upper grille-carrying member; and means securing the lower grille-carrying member to the lower shell.

2. A vehicle radiator grille assembly, comprising: an upper shell having a generally horizontal, substantially flat under surface; a lower shell spaced below the upper shell and having a generally horizontal, substantially flat top surface; a vertically corrugated grille member extending vertically between said under and top surfaces; an upper grille-carrying member disposed below the under surface of the upper shell and having pockets therein to receive the upper part of said corrugated grille member; a lower grille-carrying member mounted on the top surface of the lower shell and having pockets therein to receive the lower part of said corrugated grille member; and means extending vertically between the upper and lower shells for securing same together with the grille member and carrying members therebetween.

3. A vehicle radiator grille assembly, comprising: an upper shell having a generally horizontal, substantially flat under surface; a lower shell spaced below the upper shell and having a generally horizontal, substantially flat top surface; a grille member extending vertically between said under and top surfaces and including vertically running corrugations extending from top to bottom thereof; an upper grille-carrying member disposed below the under surface of the upper shell and having pockets therein to receive the upper part of said corrugated grille member; a lower grille-carrying member mounted on the top surface of the lower shell and having pockets therein to receive the lower part of said corrugated grille member; and means securing the assembly together with the grille member substantially in compression between the upper shell and upper carrying member and the lower shell and carrying member, including a plurality of securing members extending vertically between the upper and lower shells and in part concealed by certain corrugations in the grille member.

4. A vehicle radiator grille assembly, comprising: an upper shell having a generally horizontal, substantially flat under surface; a lower shell spaced below the upper shell and having a generally horizontal, substantially flat top surface; a grille member extending vertically between the upper and lower shells and including vertically running corrugations at the top and bottom thereof; an upper grille-carrying member disposed below the under surface of the upper shell and having pockets therein to receive the corrugations at the top of the grille member; a lower grille-carrying member mounted on the top surface of the lower shell and having pockets therein to receive the corrugations at the bottom of the grille member; means extending vertically between the upper carrying member and the lower shell for securing said upper carrying member to the lower shell with the grille and lower carrying member therebetween; and means removably securing the upper shell to the upper carrying member.

5. A vehicle radiator grille assembly, comprising: an upper shell having a generally horizontal, substantially flat under surface; a lower shell spaced below the upper shell and having a generally horizontal, substantially flat top surface; a grille member extending vertically between the upper and lower shells and including vertically running corrugations at the top and bottom thereof; an upper grille-carrying member disposed below the under surface of the upper shell and having pockets therein to receive the corrugations at the top of the grille member; a lower grille-carrying member mounted on the top surface of the lower shell and having pockets therein to receive the corrugations at the bottom of the grille member; means extending vertically between the upper carrying member and the lower shell for securing said upper carrying member to the lower shell with the grille and lower carrying member therebetween; and means including extensions of said vertically extending securing means for removably mounting the upper shell on the upper carrying member.

6. A vehicle radiator grille, comprising a base member having an upper, generally horizontal, transverse mounting portion provided with a plurality of transversely spaced, upwardly opening pockets having bottoms therein; a grille member extending upwardly from the base member and generally transversely thereacross and having a lower part provided with a plurality of transversely spaced portions conforming generally in shape to and fitting the aforesaid pockets and seating on the bottoms of said pockets; and means securing the grille member to the base member.

7. The invention defined in claim 6, further characterized in that: the grille member includes an upper part provided with transversely spaced portions similar to the portions at the lower part; an upper member is positioned above the grille member and has an under, generally horizontal, transverse portion provided with a plurality of transversely spaced, downwardly opening pockets to receive and seat on the aforesaid portions at the upper part of the grille member; and means is provided for securing the upper member in position at the upper part of said grille member.

8. A vehicle radiator grille assembly, comprising a base member having a transverse portion and a pair of generally parallel longitudinal side portions; means on the transverse portion providing an upper mounting element having a plurality of transversely spaced pockets; a grille member extending upwardly from the base member and having a transverse portion generally co-extensive with the base member transverse portion and a pair of vertical side portions extending generally parallel to each other and in part co-extensive respectively with the base member side portions, leaving part of each of said base member side portions extending therebeyond; means at the lower part of the transverse portion of the grille providing a plurality of transversely spaced projections fitting and received by the spaced pockets in the base member transverse portion; means securing the grille member to the base member; side sheets extending upwardly respectively from the aforesaid extending parts of the base member side portions substantially as longitudinal extensions respectively of the grille member side portions; means securing said side sheets respectively to the base member side portions; and means securing the side sheets respectively to the grille member side portions.

9. In a vehicle radiator grille assembly; a base member having a transverse mounting plate; means forming a transverse recess in the mounting plate and providing a transverse horizontal ledge and an adjoining transverse generally vertical shoulder; a grille member extending upwardly from the mounting plate and resting at its bottom on said ledge and further including a vertical part provided generally as a U in transverse section having a portion engaging the aforesaid shoulder; a second plate above the mounting plate and positioned generally parallel to the transverse recess and spaced closely above the ledge; means securing the second plate to the mounting plate in said position; and means in said second plate including a pocket for receiving the aforesaid U-shaped portion of the grille member.

10. The invention defined in claim 9, further characterized in that: the second plate is provided with a vertical flange portion bordering said pocket and contoured to fit the U-shaped portion of the grille member, said flange further being positioned in spaced relation to said shoulder to confine the aforesaid portion of the U-shaped part of the grille member therebetween.

11. In a vehicle radiator grille assembly: a base member having a transverse mounting plate; means forming a transverse recess in the mounting plate and providing a transverse horizontal ledge and an adjoining transverse generally vertical shoulder; a second plate extending transversely and above the mounting plate and positioned closely above and generally paralleling the ledge; means providing in the second plate a plurality of transversely spaced pockets of generally U shape as viewed from above and arranged with the open end of each U toward the shoulder; means on said second plate including a depending generally transverse sinuous flange bordering the pockets and at transversely spaced intervals between the pockets lying closely adjacent said shoulder; and a grille member extending upwardly from the base and plates and having a lower part including transversely spaced, vertical corrugations which provide a generally transverse sinuous structure fitting the aforesaid pockets and following and engaging said depending sinuous flange, said sinuous structure at transversely spaced intervals fitting between the shoulder and the aforesaid portions of said sinuous flange that lie closely adjacent said shoulder.

12. The invention defined in claim 11, further characterized in that: the second plate is mounted in closely spaced relation above the ledge by a plurality of spacer elements disposed between the under surface of said second plate and the upper surface of said ledge and spaced transversely thereof intermediate certain of said pockets; and means is provided for securing the second plate to the mounting plate with the spacer elements therebetween.

13. In a vehicle radiator grille assembly: a base member having a transverse mounting plate; a second plate extending transversely and above and generally paralleling the upper surface of the mounting plate; means providing in the second plate a plurality of transversely spaced pockets of generally U shape as viewed from above and having bottoms therein; means on said second plate including a depending, generally transverse sinuous flange bordering the pockets; and a grille member extending upwardly from the base and plates and having a lower part including transversely spaced, vertical corrugations which provide a generally transverse sinuous structure fitting the aforesaid pockets and seating on the bottoms thereof and following and engaging said depending sinuous flange, and resting on the upper surface of the mounting plate.

14. In a vehicle radiator grille assembly: a grille receiving element including an elongated, generally flat surfaced plate having a plurality of pockets therein spaced lengthwise thereof, said pockets being substantially U shaped as viewed along a line normal to the flat surface of the plate; means on the plate providing a flange at substantially a right angle to the flat surface of the plate and extending sinuously and lengthwise of the plate to border the aforesaid pockets; and a grille member positioned to extend generally at a right angle to the flat surface of the plate and having a portion proximate to the plate including corrugations extending normal to the flat surface of the plate and spaced on the order of the aforesaid pockets and contoured according to said sinuous flange to fit said pockets and engage said flange.

15. In a vehicle radiator grille assembly: a lower support having a transverse, vertical front wall including at its upper edge a rearwardly directed flange extending substantially transversely there-across; a mounting plate extending transversely across the front wall and having a transverse, horizontal portion disposed below the upper edge of said front wall so that a portion of said front wall including the flange projects upwardly beyond the mounting plate, and further including an upstanding shoulder portion extending transversely thereacross in rearwardly spaced relation to that portion of the front wall that projects upwardly beyond said horizontal portion, whereby said horizontal portion, said upwardly projecting front wall portion and said shoulder portion provide a transverse channel in the lower support; an upstanding grille member carried in said channel; and a member engaging said grille member and having a portion projecting into the channel and engaged by the front wall flange.

16. The invention defined in claim 15, further characterized in that: the grille member is provided with transversely spaced vertical corrugations of a depth generally equal to the width of and received in the channel.

17. The invention defined in claim 16, further characterized in that: the grille-engaging member is provided with transversely spaced pockets receiving the corrugations in the grille member.

18. In a vehicle radiator grille assembly: a lower support having a transverse, vertical front wall extending substantially transversely thereacross; a mounting plate extending transversely across the front wall and having a transverse, horizontal portion disposed below the upper edge of said front wall so that a portion of said front wall projects upwardly beyond the mounting plate, and further including an upstanding shoulder portion extending transversely thereacross in rearwardly spaced relation to that portion of the front wall that projects upwardly beyond said horizontal portion, whereby said horizontal portion, said upwardly projecting front wall portion and said shoulder portion provide a transverse channel in the lower support; an upstanding grille member carried in said channel; and a member engaging said grille member and having a portion projecting into the channel and engaged by one of said portions of said channel.

19. In a vehicle radiator grille assembly: a lower support having a transverse, vertical front wall extending substantially transversely thereacross; a mounting plate extending transversely across the front wall and having a transverse, horizontal portion disposed below the upper edge of said front wall so that a portion of said front wall projects upwardly beyond the mounting plate and further including an upstanding shoulder portion extending transversely thereacross in rearwardly spaced relation to that portion of the front wall that projects upwardly beyond said horizontal portion, whereby said horizontal portion, said upwardly projecting front wall portion and said shoulder portion provide a transverse channel in the lower support; an upstanding grille member carried in said channel; and a member including a generally flat, plate-like portion generally paralleling the channel and positioned in closely spaced relation above the horizontal portion of the channel; spacer means interposed between the under surface of said plate-like portion and the upper surface of said horizontal portion; and means securing the plate-like portion to the mounting plate with the spacer means in position as aforesaid.

20. In a vehicle radiator grille assembly: a lower support having a transverse, vertical front wall extending substantially transversely thereacross; a mounting plate extending transversely across the front wall and having a transverse, horizontal portion disposed below the upper edge of said front wall so that a portion of said front wall projects upwardly beyond the mounting plate, and further including an upstanding shoulder portion extending transversely thereacross in rearwardly spaced relation to that portion of the front wall that projects upwardly beyond said horizontal portion, whereby said horizontal portion, said upwardly projecting front wall portion and said shoulder portion provide a transverse channel in the lower support; an upstanding grille member having a lower portion provided with transversely spaced, generally vertically running corrugations extending into said channel; and a member above and generally paralleling said channel and having a substantially vertically flanged structure of sinuous configuration transversely on the order of the corrugations of the grille member and disposed adjacent the channel to receive said corrugations.

WALLACE H. DU SHANE.

REFERENCES CITED

The following references are of record in the file of this patent:

UNITED STATES PATENTS

| Number | Name | Date |
| --- | --- | --- |
| 1,533,982 | Firkins | Apr. 14, 1925 |
| 2,021,929 | Voigt | Nov. 26, 1935 |
| 2,071,673 | Whitlock | Feb. 23, 1937 |